United States Patent
Sørensen et al.

(10) Patent No.: US 6,581,717 B1
(45) Date of Patent: Jun. 24, 2003

(54) HYDRAULIC STEERING ARRANGEMENT

(75) Inventors: Ole Vincentz Sørensen, Nordborg (DK); John Børsting, Holstebro (DK); Lars Mortensen, Augustenborg (DK); John Kristensen, Sønderborg (DK); Peter Peistrup, Nordborg (DK)

(73) Assignee: Sauer Danfoss Holding A/S (DK)

( * ) Notice: Subject to any disclaimer, the term of this patent is extended or adjusted under 35 U.S.C. 154(b) by 0 days.

(21) Appl. No.: 09/701,059

(22) PCT Filed: Jun. 7, 1999

(86) PCT No.: PCT/DK99/00302

§ 371 (c)(1),
(2), (4) Date: Jan. 17, 2001

(87) PCT Pub. No.: WO99/64286

PCT Pub. Date: Dec. 16, 1999

(30) Foreign Application Priority Data

Jun. 9, 1998 (DE) .......................... 198 25 579

(51) Int. Cl.[7] .............................................. B62D 5/00
(52) U.S. Cl. ..................... 180/401; 180/403; 180/406; 180/441; 180/442
(58) Field of Search ............................. 180/417, 403, 180/441, 405, 406, 404, 422, 415, 421

(56) References Cited

U.S. PATENT DOCUMENTS

| 4,219,093 | A | * | 8/1980 | Lang .......................... 180/401 |
| 4,332,303 | A | * | 6/1982 | de Maight .................. 180/441 |
| 4,736,811 | A | * | 4/1988 | Marsden et al. ............ 180/406 |
| 4,955,445 | A | * | 9/1990 | Kauss ......................... 180/406 |
| 5,186,211 | A | * | 2/1993 | Stephenson et al. ... 137/625.24 |
| 5,234,070 | A | * | 8/1993 | Noah et al. ................. 180/169 |
| 5,862,878 | A | * | 1/1999 | Bohner et al. .............. 180/403 |
| 6,213,247 | B1 | * | 4/2001 | Rom et al. ................... 180/441 |
| 6,298,940 | B1 | * | 10/2001 | Bohner et al. ............. 180/403 |
| 6,405,824 | B1 | * | 6/2002 | Sørensen et al. ........... 180/442 |
| 2001/0020489 | A1 | * | 9/2001 | Givensen et al. .......... 137/596 |
| 2001/0020557 | A1 | * | 9/2001 | Givensen et al. .......... 180/417 |
| 2001/0032751 | A1 | * | 10/2001 | Givensen et al. .......... 180/441 |

FOREIGN PATENT DOCUMENTS

GB 2351715 A * 1/2001

* cited by examiner

Primary Examiner—Lesley D. Morris
Assistant Examiner—Daniel Yeagley
(74) Attorney, Agent, or Firm—William M. Lee, Jr.; Barnes & Thornburg

(57) ABSTRACT

A hydraulic steering arrangement with a steering handwheel which is connected with a hydraulic steering unit, and with a steering motor connected with a pump via a steering valve. In a steering arrangement of this kind, a simple construction is desired, though under maintenance of the required security. For this purpose, the steering valve can optionally be operated by a steering handwheel or by a hydraulic pressure generated by a control pressure generator.

9 Claims, 1 Drawing Sheet

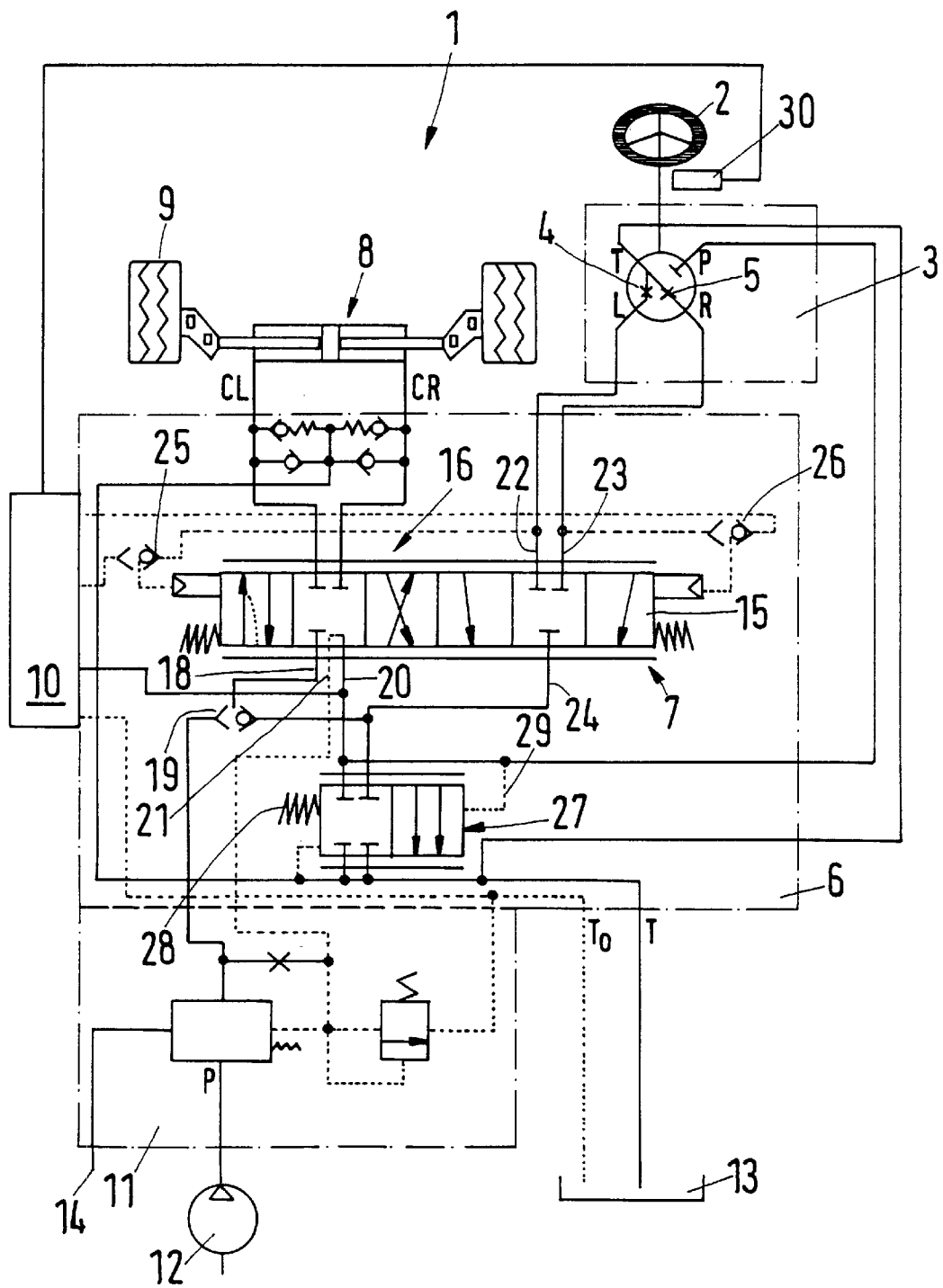

HYDRAULIC STEERING ARRANGEMENT

BACKGROUND OF THE INVENTION

The invention concerns a hydraulic steering arrangement with a steering handwheel which is connected with a hydraulic steering unit, and with a steering motor connected with a pump via a steering valve.

A steering arrangement of this kind is known from U.S. Pat. No. 5,234,070. In dependence of the direction determined by the steering handwheel, the steering valve releases a connection between the pump and the steering motor, which finally causes the angle movement of the steered wheels of a vehicle. For this purpose, an angle sensor, connected with a microprocessor, is arranged on the steering hand-wheel. This microprocessor controls electromagnetic drives, displacing the slide of the steering valve in one direction or the other. On failure of the electromagnetic drives, the slide of the steering valve can also be displaced by a hydraulic pressure, which is produced by a pump connected with the steering handwheel, when the steering handwheel is turned.

An embodiment of this kind meets certain security requirements, as a vehicle equipped in that manner can still be steered when the electrical components fail. However, the embodiment of the steering valve is relatively complicated.

SUMMARY OF THE INVENTION

It is the task of the invention to provide a simple embodiment of a steering arrangement though securing a safe operation.

In a hydraulic steering arrangement of the kind described in the introduction, this task is solved in that optionally the steering valve can be operated by a steering handwheel or by a hydraulic pressure generated by a control pressure generator.

Thus, the embodiment of the steering valve becomes relatively simple. Merely a connecting arrangement must be provided, via which the hydraulic pressure for the control of the steering valve can act upon the operating element, for example a slide. A synchronisation between an electromagnetic additional drive and a hydraulic drive is not required. Accordingly, it must be assumed that the switching from a "servo operation", by which the hydraulic pressure comes from the control pressure generator, to the "manual operation", by which the hydraulic pressure is produced by the steering handwheel, is less felt by the driver.

In a preferred embodiment it is provided that the control pressure generator converts an electrical input signal to a hydraulic control pressure. Thus, all the control opportunities also obtained with a direct electromagnetic drive of the steering valve slide are maintained. For example, the control pressure generator can be controlled by a microprocessor or a remote control. A control pressure generator is manufactured by the applicant, for example under the name PVE.

Preferably, the steering handwheel has a sensor, which is connected with the control pressure generator. Thus, the steering handwheel cannot only be used for building up the hydraulic pressure required for the operation of the steering valve in the case of a failure. By means of the sensor, the signals to be used for the steering of the vehicle, can be obtained directly. Thus, a plurality of control algorithms can be realised. This is particularly advantageous, when the steering arrangement is to be used in driven machines, for example fork lift trucks. In this connection, the term "steering handwheel" does not only mean the part actually operated by the driver, but also all parts connected with it, for example the steering column.

Preferably, for each movement direction of its slide the steering valve is connected with an outlet of a shuttle valve, whose one inlet is connected with the steering unit and whose other inlet is connected with the control pressure generator. With a shuttle valve of this kind, the switching from servo operation to manual operation can be automated. The shuttle valve always passes on the higher pressure of its two inlets to the outlet. On a failure of the control pressure generator, for example caused by a failure in the electrical energy supply, it stops producing hydraulic pressure. Accordingly, the pressure produced by the steering unit is larger on a steering movement of the steering handwheel. This pressure is then passed on to the control inlets of the steering valve in order to operate the slide.

Preferably, the pressure produced by the steering unit is larger than the pressure produced by the control pressure generator. In this case, it will still be possible also to intervene in the steering of the vehicle, when the control pressure generator is working. An intervention of this kind may be required in an emergency situation. As the pressures produced by the steering unit are larger than the pressures produced by the control pressure generator, an operation of the steering unit will cause a switching of the belonging shuttle valve. As the shuttle valve makes a unique choice of the pressure to be passed on to its outlet, an operation of the steering handwheel will cause that the control pressure generator no longer has any influence on the steering behaviour of the vehicle. Preferably, the pump inlet of the steering valve is connected with the outlet of a shuttle valve, whose one inlet has a connection with the pump and whose other inlet has a connection with the steering unit. This adds a third step to the security of the steering unit. A steering operation is namely also provided, when also the pump (or the pressure source available in the vehicle) fails. Normally, the pump produces the pressure required for the operation of the pump. As long as the pump works, the shuttle valve passes on the pump pressure to the steering valve. The connection to the steering handwheel or the steering unit, respectively, is, however, interrupted by the shuttle valve, so that there is no risk of negative effects of the pump pressure on the steering unit. When, however, the pump pressure drops below the pressure produced by the steering unit, the pressure produced by the steering unit will be used to operate the steering motor. As such a pressure production only occurs, when the steering valve has been operated by the steering unit, a connection between the steering unit and the steering motor also exists via the shuttle valve and the steering valve. This connection is interrupted, when the steering handwheel is no longer turned, so that there is no risk of a counter-effect of the steering motor on the steering handwheel.

Preferably, the connection between the steering unit and the shuttle valve is interrupted in the neutral position of the steering valve. This is an additional security measure. A connection is only set free, when a pressure actually has to be passed on. In the neutral position of the steering valve, counter-effects on the steering handwheel are avoided.

Preferably, the connection between the steering unit and the shuttle valve is led through the steering valve. This makes it easier to ensure that the connections between the steering unit and the shuttle valve on the one hand and between the shuttle valve and the steering motor on the other hand are always interrupted or released simultaneously.

In a particularly simple embodiment, this is preferably obtained in that both the connection between the steering unit and the shuttle valve and the connection between the shuttle valve and the steering motor are controlled by the same valve slide. A movement of the valve slide, which is required to produce a connection between the pump and the steering motor, will automatically also produce the connection between the steering unit and the shuttle valve. When, however, the slide returns to its neutral position, not only the first connection, but also the second connection, is interrupted.

Preferably, a pilot pressure valve, controlled by a load sensing pressure, is arranged between the connection of steering unit and shuttle valve and a pressure sink. With this pilot pressure valve it can be obtained that the signal pressure generator can provide relatively small control pressures, also when higher pressures rule in the load sensing pressure line (LS line). This is normally the case, as there the pressure from the steering motor is used to control the belonging pump. By means of the pilot pressure valve, the corresponding excess pressure can be reduced by returning hydraulic fluid to the tank.

BRIEF DESCRIPTION OF THE DRAWING

In the following, the invention is described in detail by means of a preferred embodiment example in connection with the drawing, showing:

Only FIGURE: a schematic view of a hydraulic steering arrangement

DESCRIPTION OF THE PREFERRED EMBODIMENT

A hydraulic steering arrangement 1 has a steering handwheel 2 connected with a hydraulic steering unit 3. The hydraulic steering unit 3 is a conventional hydraulic steering unit with two mutually rotatable slides. In this connection, the steering handwheel rotates one of the two slides and thus releases a path from a pump connection P to one of the direction connections L, R, while the other direction connection R, L is connected with a tank connection T. The hydraulic fluid flow operates a measuring motor, which accordingly brings the second slide into overlapping the first slide again, to interrupt the hydraulic fluid flow again in dependence of the movement of the steering handwheel 2. The measuring motor can also be used as auxiliary pump, so that on operation of the steering handwheel a hydraulic pressure will be produced at one of the two direction connections L, R. As schematically shown, each of the direction connections L, R, is connected in series with a throttle 4, 5.

The steering arrangement 1 also has a valve block 6 comprising a steering valve 7. At its outlet, the valve block 6 is connected with a steering motor 8 operating the steered wheels 9 of a vehicle (not shown in detail). For this purpose, the valve block has two directions connections CL, CR, which are connected with corresponding working chambers of the steering motor 8.

A control pressure generator 10 is flanged onto the valve block 6, which generator, as will be explained later, produces hydraulic pressures, which can be used for the operation of the steering valve 7.

Via a priority valve 11, the valve block 6 is connected with a pump 12. An additional connection exists between the valve block 6 and a tank 13. Instead of the pump 12 shown, another pressure source can be used, and instead of the tank 13 shown, another pressure sink can be used.

The priority valve 11 is known per se. It ensures that the steering arrangement 1 is preferably supplied with pump pressure, also when other consumers are connected to a connection 14.

The steering valve has a slide 15 shown in the neutral position.

The slide 15 has a first section 16, which is responsible for a connection between the steering motor 8 and the pump 12. For this purpose a first connection 18 is provided, which is connected with the outlet of a shuttle valve 19. An inlet of the shuttle valve 19 is connected with the pump 12 via the priority valve 11. When the slide 15 is moved to the right, the connection 18 is connected with the steering connection CL. The steering connection CR is connected with a connection 20, through which returning hydraulic fluid can reach the tank 13, as will be explained below. At the same time, an LS connection 21 is supplied with the load pressure from the steering motor 8. The LS connection 21 is thus always submitted to the highest pressure existing in the system.

When the slide 15 is moved to the left, the other outlet CR is accordingly supplied with pressure, and the wheels 9 are steered in the opposite direction.

Further, the steering valve has two connections 22, 23, which are connected with the corresponding direction connections L, R of the steering unit 3. When the slide 15 is displaced to the right, the connection 22 gets in connection with the second inlet of the shuttle valve 19. When the slide 15 is displaced in the other direction, the connection 23 is connected with the shuttle valve 19 via the connection 24 of the steering valve 7.

The displacement of the slide 15 takes place under the influence of hydraulic pressures. The springs, which are not directly marked, only serve the purpose of keeping the slide 15 in its neutral position.

The hydraulic pressures used to operate the steering valve 7 can be produced in two different ways. For one, the hydraulic pressures are produced by the control pressure generator 10 and led to the front sides of the slide 15 via the shuttle valves 25, 26. However, the hydraulic pressures can also be produced by an operation of the steering unit 3. The other inlets of the shuttle valves 25, 26 are namely connected with the connections 22, 23. The shuttle valves 25, 26 passes on the higher of the two pressures from the control pressure generator 10 or the steering unit 3, respectively, to the front sides of the slide 15 of the steering valve 7. As it is guaranteed that the pressures produced by the control pressure generator are always smaller than the pressures produced by the steering unit 3, it is ensured that it is always possible to intervene in the steering behaviour of the vehicle by means of the steering handwheel 2, independently of the control pressures produced by the control pressure generator 10.

Also when the control pressure generator 10 fails, the slide 15 of the steering valve 7 can be displaced. In this case the control pressure of the control pressure generator is equal to zero, so that the shuttle valves 25, 26 pass on the inevitably higher pressure of the steering unit 3 to the front sides of the slide 15, which is thus displaced.

When the slide 15 of the steering valve 7 has been displaced to a working position, a connection exists between one of the two connections 22, 23 and the connection 24. When the pump 12 fails, the connection 24 is submitted to the pressure produced by the steering unit 3, for example by means of the measuring motor then serving as pump. This pressure is then passed on to the steering motor 8 via the shuttle valve 19, so that steering of the vehicle is still possible during a pump 12 failure.

As long as the pump produces its pressure, the pressure at the connection 24 is always smaller, as a pressure drop occurs at the throttles 4, 5 in the steering unit 3.

Via a pilot pressure valve 27, the connection 20 is connected with a tank line T. In the closing direction the pilot pressure valve is acted upon by a spring 28 and in the opening direction via a control pressure line 29.

In the neutral position of the slide 15 shown, the LS connection 21 is connected with the connection 20. Accordingly, the control pressure from the valve 11 is passed on to the line 29. When this control pressure is higher than the force of the spring 28, the pilot pressure valve 27 opens, and the excess pressure can flow off to the tank 13. Thus, it is possible to keep the control pressure at a predetermined value, for example 12 bar. In this case, a connection from the connection 24 to the tank 13 is released at the same time, so that the second inlet of the shuttle valve 19 is relieved.

When, however, the slide 15 is displaced to one of its working positions, the connection between the LS-connection 21 and the connection 20 is interrupted. The connection 20 is then submitted to the pressure of the fluid returning from the steering motor. When this pressure exceeds the force of the spring 28, the pilot pressure valve 27 opens, and the fluid can flow off to the tank 13. The same also applies, when the pump fails and the steering motor 8 is supplied with pressure from the steering unit 3.

The pump connection P of the steering unit 3 is connected with the connection 20 of the steering valve 7. Accordingly, in the neutral position of the slide 15, it receives the pressure in the LS connection 21, so that the steering unit 3 can pass on this pressure as control pressure to one of the two connections 22, 23. When the slide 15 is operated, the connection P of the steering unit 3 receives the pressure of the fluid displaced by the steering motor, which pressure always assumes a predetermined minimum value due to the pilot pressure valve 27, so that this also contributes to the production of the required control pressures.

On the steering handwheel 2 a sensor 30 is arranged, which is connected (not shown in detail) with the control pressure generator 10. By means of the sensor 30, for example, the angle position of the steering handwheel 2 can be detected, the control pressure generator 10 using this information and predetermined algorithms to produce the corresponding control pressures in accordance with size and time, to operate the slide 15.

What is claimed is:

1. Hydraulic steering arrangement having a steering handwheel which is connected with a hydraulic steering unit and having a steering motor connected with a pump via a steering valve, a control pressure generator and means for operating the steering valve by either the steering handwheel or hydraulic pressure generated by the control pressure generator, and in which the control pressure generator is electrical and converts an electrical input signal to a hydraulic control pressure.

2. Steering arrangement according to claim 1, in which the steering handwheel has a sensor which is connected to the control pressure generator.

3. Steering arrangement according to claim 1 including a pilot pressure valve, controlled by a load sensing pressure, located between connection of the hydraulic steering unit and a shuttle valves and a pressure sink.

4. Hydraulic steering arrangement having a steering handwheel which is connected with a hydraulic steering unit and having a steering motor connected with a pump via a steering valve, a control pressure generator and means for operating the steering valve by either the steering handwheel or hydraulic pressure generated by the control pressure generator, and in which for each movement direction of a slide of the steering valve, the steering valve is connected with an outlet of a shuttle valve having one inlet connected to the steering unit and another inlet connected to the control pressure generator.

5. Steering arrangement according to claim 4, which pressure produced by the steering unit is larger than pressure produced by the control pressure generator.

6. Hydraulic steering arrangement having a steering handwheel which is connected with a hydraulic steering unit and having a steering motor connected with a pump via a steering valve, an electric control pressure generator and means for operating the steering valve by either the steering handwheel or hydraulic pressure generated by the control pressure generator, and in which a pump inlet of the steering valve is connected to an outlet of a shuttle valve having one inlet of the shuttle valve connected with the pump and another inlet of the shuttle valve connected with the steering unit.

7. Steering arrangement according to claim 6, in which connection between the steering unit and the shuttle valve is interrupted in a neutral position of the steering valve.

8. Steering arrangement according to claim 7, in which connection between the steering unit and the shuttle valve is through the steering valve.

9. Steering arrangement according to claim 8, in which both connection between the steering unit and the shuttle valve and connection between the shuttle valve and the steering motor is controlled by the same slide.

* * * * *